A. L. LARSON.
ROLLER BEARING.
APPLICATION FILED OCT. 21, 1913.
1,160,293.
Patented Nov. 16, 1915.
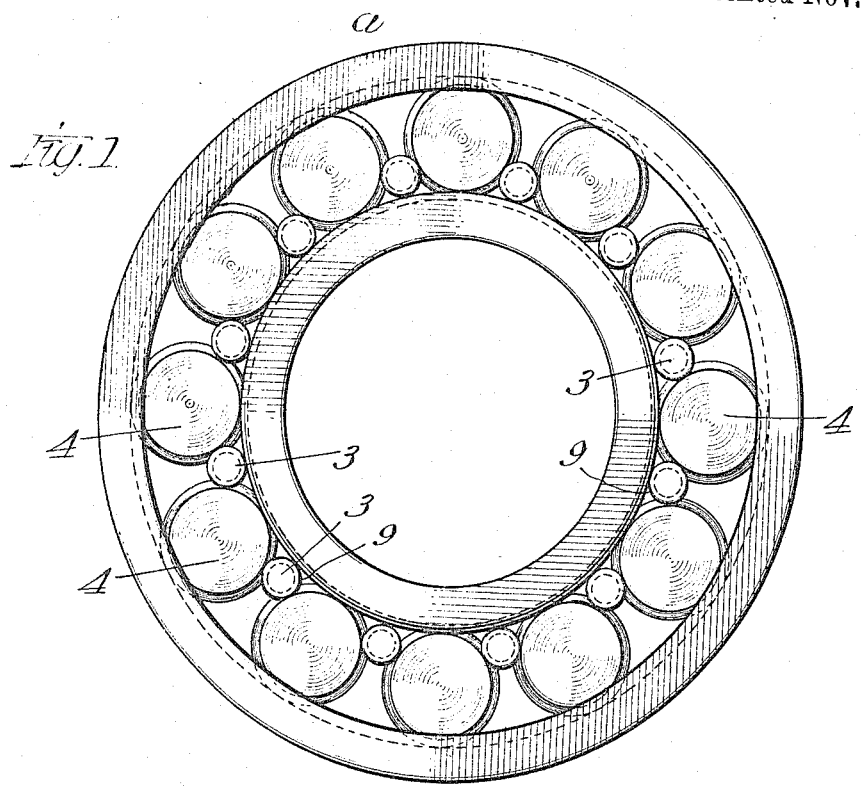
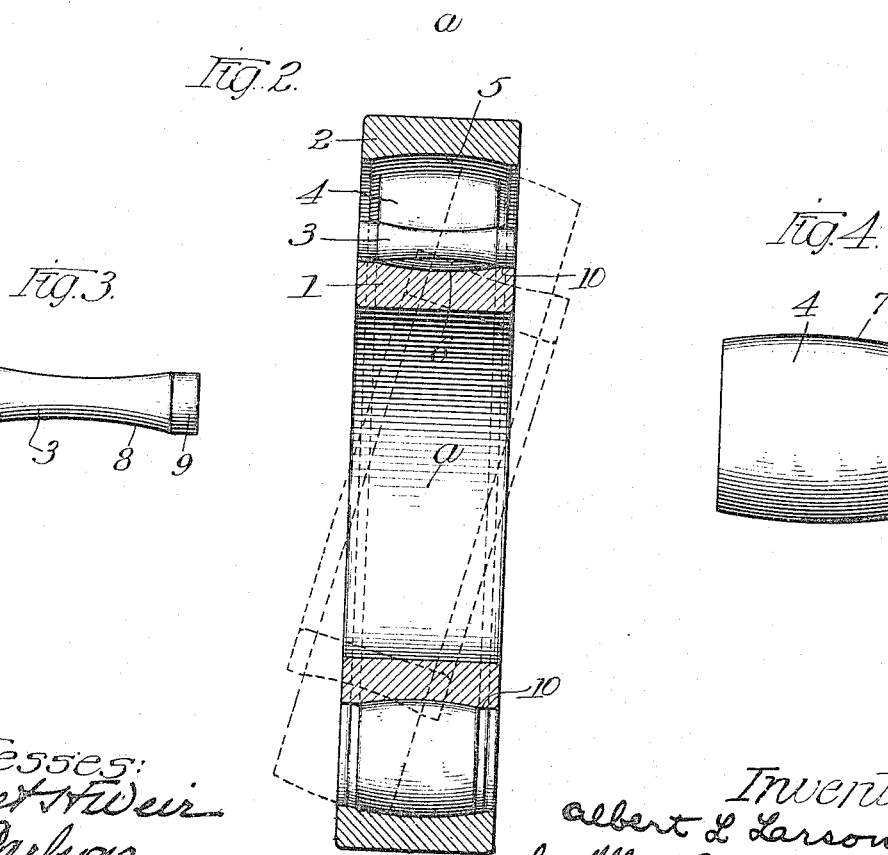

UNITED STATES PATENT OFFICE.

ALBERT L. LARSON, OF BELOIT, WISCONSIN.

ROLLER-BEARING.

1,160,293.

Specification of Letters Patent. Patented Nov. 16, 1915.

Application filed October 21, 1913. Serial No. 796,374.

*To all whom it may concern:*

Be it known that I, ALBERT L. LARSON, a citizen of the United States, residing at Beloit, in the county of Rock and State of Wisconsin, have invented a certain new and useful Improvement in Roller-Bearings, of which the following is a full, clear, concise, and exact description, reference being had to the accompanying drawings, forming a part of this specification.

My invention relates to roller bearings and has for its object the provision of an improved bearing of this nature using rollers having a curved outline or contour.

My invention further has for its object the provision of an improved roller bearing of this character in which by the suitable selection of the contour of the rollers an interlocking action is secured which serves to hold the rollers in position.

One of the advantages of thus constructing a roller bearing resides in the provision of a larger bearing surface so that the structure can withstand a greater end thrust.

In one of the forms of my invention I utilize rollers of different size to secure proper interlocking action between said rollers, thereby to eliminate the necessity of having a cage to confine the rollers.

My invention is also designed to permit of a ready assembly of the bearing in that the two bearings between which the rollers are mounted are so arranged that one or the other can be swung into or out of engagement with the rollers.

I will describe one form which my invention may take more in detail by referring to the accompanying drawing, in which—

Figure 1 is a side view illustrating a roller bearing constructed in accordance with my invention; Fig. 2 is a sectional view on line *a—a* of Fig. 1; Fig. 3 is a detail side view of one of the rollers, and Fig. 4 is a detail side view of the other roller.

In accordance with my invention I provide an inner annular ring 1 and an outer annular ring 2 which form the two relatively rotatable parts of the bearing structure and between which suitable rollers 3, 3, and 4, 4 are mounted.

The rollers 3 are as shown more clearly in Fig. 3 and the rollers 4 have the outline more clearly illustrated in Fig. 4. The annular rings 1 and 2 have curved surfaces 5 and 6 which conform in curvature to the curved surface 7 of the roller 4, although the curved surfaces 5 and 6 are preferably with a somewhat larger radius. The radius of the curve 5 is as if it were struck from the center point *a* of the bearing when the rollers are in place. The curve 6 is also of the same radius as the curve 5.

From this it will be apparent that when the device is assembled that the two parts 1 and 2 can be swung relatively as indicated in Fig. 2 by the dotted lines in such a way as to separate these two elements and thus release the rollers 3 and 4. In the same way the device can of course be assembled. The rollers 4 as stated engage the opposite rounded surfaces provided in the elements 1 and 2 and these rollers at the same time co-act with the rollers 3, which rollers 3 have a curved surface 8 drawn from the same radius as that used for the curve 7 of the roller 4. In this way it will be seen that the two rolls 3 and 4 interlock and thereby hold themselves in position and are therefore self alined. The roller 3 is longer than the roller 4 by having added to its extremity two cylindrical sections 9, 9, whose flat cylindrical surface is adapted to co-act with and roll upon the flat cylindrical surface 10 forming part of the bearing surface of the element 1. The rollers 3 thus roll upon the flat cylindrical surface of the element 2 and then by means of their curved surface 8 interlock with the curved surface 7 of the rollers 4 so that all of the rollers are thereby held in place.

By the use of rollers thus constructed instead of balls I get a larger bearing surface so that the bearing as a whole may withstand a larger end thrust and will also stand a greater radial load. In thus having the rollers interlock as set forth, these rollers are held in place without the necessity of using a cage, thus simplifying the structure and increasing the facility with which the device may be put together and taken apart.

From what has been described it is thought the nature of my invention will be entirely clear, and it will also be apparent that modifications may be readily made without departing from the spirit of my invention.

Having however thus described one form which my invention may take, what I claim as new and desire to secure by Letters Patent is:

A bearing of the character described having two annular relatively rotatable rings and a plurality of interlocking rollers of unlike sizes interposed between said rings, said rollers having bearing surfaces of circular outline, the surface of one roller being convex and the surface of the other roller being concave, one of said rollers having cylindrical extensions and one of said rings having a cylindrical bearing surface to bear with said cylindrical extensions, said rollers of larger size traveling along a path concentric with but different from the path of the smaller rollers, the bearing surface between said larger rollers and said outer annular ring being along an arc drawn from the center of said annular ring to thereby permit said bearing to be dismantled.

In witness whereof, I hereunto subscribe my name this 8th day of October, A. D., 1913.

ALBERT L. LARSON.

Witnesses:
G. L. Ross,
C. R. Whipple.